Figure 1:
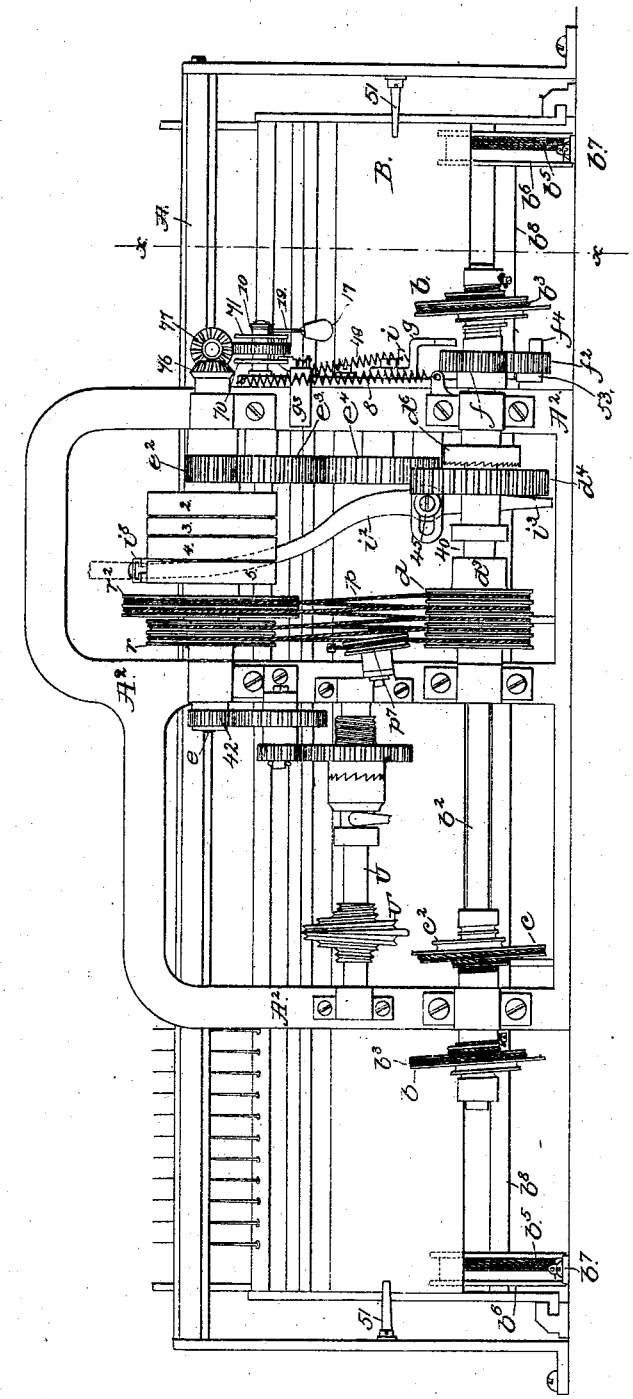

(No Model.)

E. A. BALDWIN.
SELF ACTING MULE.

No. 272,401. Patented Feb. 20, 1883.

Witnesses.
John F. C. Preinkert
Bernice J. Noyes.

Inventor.
Eben A. Baldwin
by Crosby & Gregory
Attys.

(No Model.)

E. A. BALDWIN.
SELF ACTING MULE.

No. 272,401. Patented Feb. 20, 1883.

Witnesses.
John F. C. Primkert
Bernice J. Noyes.

Inventor
Eben A. Baldwin
by Crosby & Gregory
Attys.

(No Model.)
E. A. BALDWIN.
SELF ACTING MULE.
No. 272,401. Patented Feb. 20, 1883.
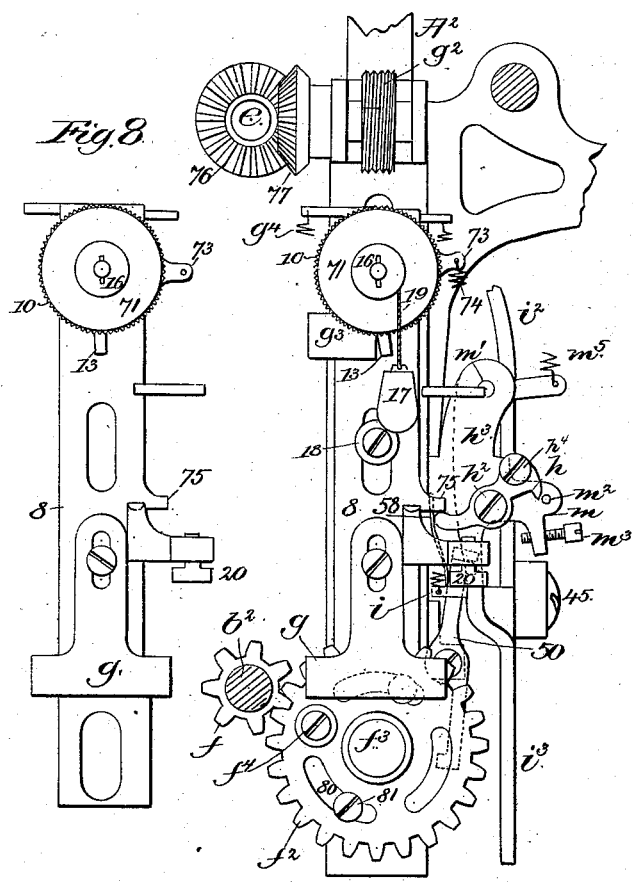
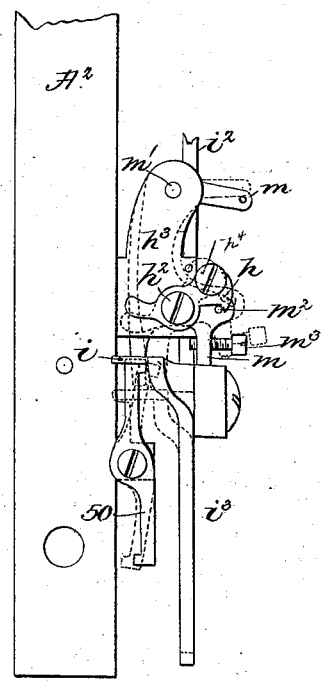
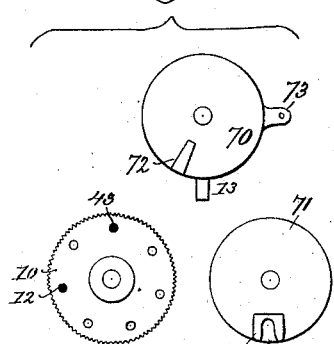
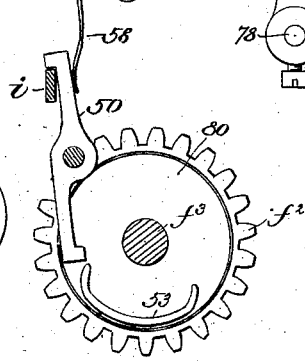
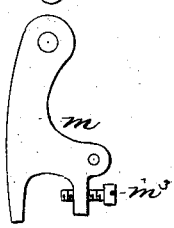

UNITED STATES PATENT OFFICE.

EBEN A. BALDWIN, OF NORTH ANDOVER, MASSACHUSETTS.

SELF-ACTING MULE.

SPECIFICATION forming part of Letters Patent No. 272,401, dated February 20, 1883.

Application filed March 6, 1882. (No model.)

*To all whom it may concern:*

Be it known that I, EBEN A. BALDWIN, of North Andover, county of Essex, and State of Massachusetts, have invented an Improvement in Self-Acting Mules, of which the following description, in connection with the accompanying drawings, is a specification.

This invention in self-acting mules is an improvement on the class of mule represented in United States Patent No. 193,887, August 7, 1877, granted to P. McGovern, to which patent reference may be had.

One part of my invention relates to improvements in mechanism for operating the spindles, whereby I may, when desired, rotate them at different speeds during different portions of the outward run or movement of the usual carriage, or just as the carriage reaches its outward position. The slow speed will be operative as the carriage commences to run out, and the fast speed may be made to commence at any position of the carriage during its outward movement, and continue until the commencement of "backing off." By this plan I am enabled to draw the yarn much slower, and when drawn to proper size, the carriage then traveling outward or having reached the limit of its outward run, or nearly so, I am enabled to increase the speed of the spindles and twist the yarn at a speed as great as the spindles will bear, thus saving time and increasing the product of the mule. The devices herein shown, which enable the change of speed to be effected automatically, include rim-wheels of two different sizes, each connected with its own belt-pulley, one belt controlled by a belt-shipper actuating one or the other of the rim-pulleys, so that the rim-band, common to both the rim-pulleys and connected with the spindle-driving drum of the carriage, drives the said drum at fast or slow speed.

Another feature of my invention consists in an organization of mechanism for actuating the belt-shipper at the proper times, to control the movement of the mule, the movement of the belt-shipper depending upon the change of position of the twist-regulating slide and the position of a pin or roll carrying gear driven by the drawing-in scroll-shaft and of the carriage. By the mechanism included in this part of my invention I am enabled to better control the exact time of movement of the belt-shipper and make its operation more certain.

In the McGovern mule referred to the twist-regulating slide, actuated by a cam on the drawing-in scroll-shaft, is lifted during the early part of the inward run of the carriage, which effects the premature engagement of the twist-regulating clock or worm gear of the said slide with the twist-worm, and causes the worm to thereafter turn the clock or worm gear as the carriage continues its inward movement and while it again runs out; but this is objectionable, as it results in irregularity of the twist put into the yarn at successive outward runs of the carriage. To obviate this difficulty, I have arranged the clock or worm gear and worm so that they cannot be engaged while the carriage is running in, but rather as the carriage is just completing or completes its inward run, so that they may be in operative engagement as the carriage starts to run out. To accomplish this, instead of actuating the twist-regulating slide by a cam fixed to the drawing-in scroll-shaft, the latter revolving not less than three times during each inward run of the carriage, as in the McGovern mule, I have provided the mule with a gear having attached to it a suitable pin or roll, which lifts the twist-regulating slide as the carriage is just completing or completes its inward run, and I have shown this gear as driven from a small pinion on the drawing-in scroll-shaft, the gear, as herein shown, turning but about three-fourths around during each inward run of the carriage. The gear and its pin or roll lift the twist-regulating slide, and engage its clock or worm gear with the worm which is to move it, just as the carriage completes its inward run, at which time a lever thereon, having a plane and an incline surface, strikes a regulating-screw forming part of a detent-lever pivoted on a bracket connected with the mule-head, and causes the said detent to release the belt-shipper and permit the latter to carry the belt from the drawing-in pulley, loose on the driving-shaft, to a pulley fast upon said shaft, causing the said shaft, by a gear thereon at its left-hand end, through suitable intermediate gears, to drive a drawing-out shaft and scroll such as shown in the McGovern patent referred to, the main driving-shaft at the same time turning the rim-wheel of smallest diameter, to drive the spindles at their slow speed. After this detent-lever has been pushed back by the carriage at its inward run, it is held back by a catch pivoted upon a suitable bracket of the mule-head, the said catch holding the detent until such time as the twist-regulating slide is permitted to drop, the latter, in its descent, acting against one arm of the belt-shipper and moving it to carry the belt upon the backing-off and drawing-in pulley. As the belt-shipper is so moved its arm referred to is carried below the lower end of the said detent, and substantially at the same time a projection on the said slide strikes the catch which holds the said detent, lifts its front end, and permits the detent to be thrown outward toward the carriage by a spring. By means of this detent I am enabled to prevent the movement of the belt upon that pulley which drives the main shaft positively and runs the carriage out and turns the spindles, until after the carriage has completed its inward run and struck its stops, thus obviating a difficulty heretofore experienced in other mules.

Should the operator desire the carriage to remain at its inward run to mend up ends, or for other reasons, he may move the shifting-rod mounted on the carriage and turn the lever thereon, referred to as having a plane and an inclined face, so that the said lever will not strike the regulating-screw on the said detent. The mule having been stopped at the inward run of the carriage, it may be started by moving the said shifting-rod and the lever connected therewith into their normal position, the inclined face thereof then striking the said regulating-screw and moving the detent, as already described.

To regulate the movement of the shipper-lever and maintain the belt upon the pulley which drives the main shaft and the rim-pulley of least diameter, and prevent the untimely movement of the belt upon the pulley which drives the rim-wheel of greatest diameter, it controlling the fast speed of the spindles, I have devised what I denominate the "fast-speed catch," it being pivoted upon the mule-head below the said detent, so that the fast-speed catch catches over an arm of and holds the shipper-lever in place. The fast-speed catch is moved at the proper time by a cam on the gear before referred to, which carries the pin or roll that lifts the twist-regulating slide, and when moved releases the belt-shipper, so that a spring connected therewith moves the belt upon the pulley which rotates the rim-pulley of greatest diameter, and turns the spindles at their fastest speed. The cam for operating the fast-speed catch has by me been made adjustable on the gear carrying it in order that the said catch may be moved at any time during the outward travel of the carriage to release the shipper and accelerate the speed of the spindles. I have provided the main shaft of the mule-head with a bevel-gear which engages a bevel-gear or a short shaft having a worm which acts to rotate the clock or worm gear of the twist-regulating slide.

Figure 2:
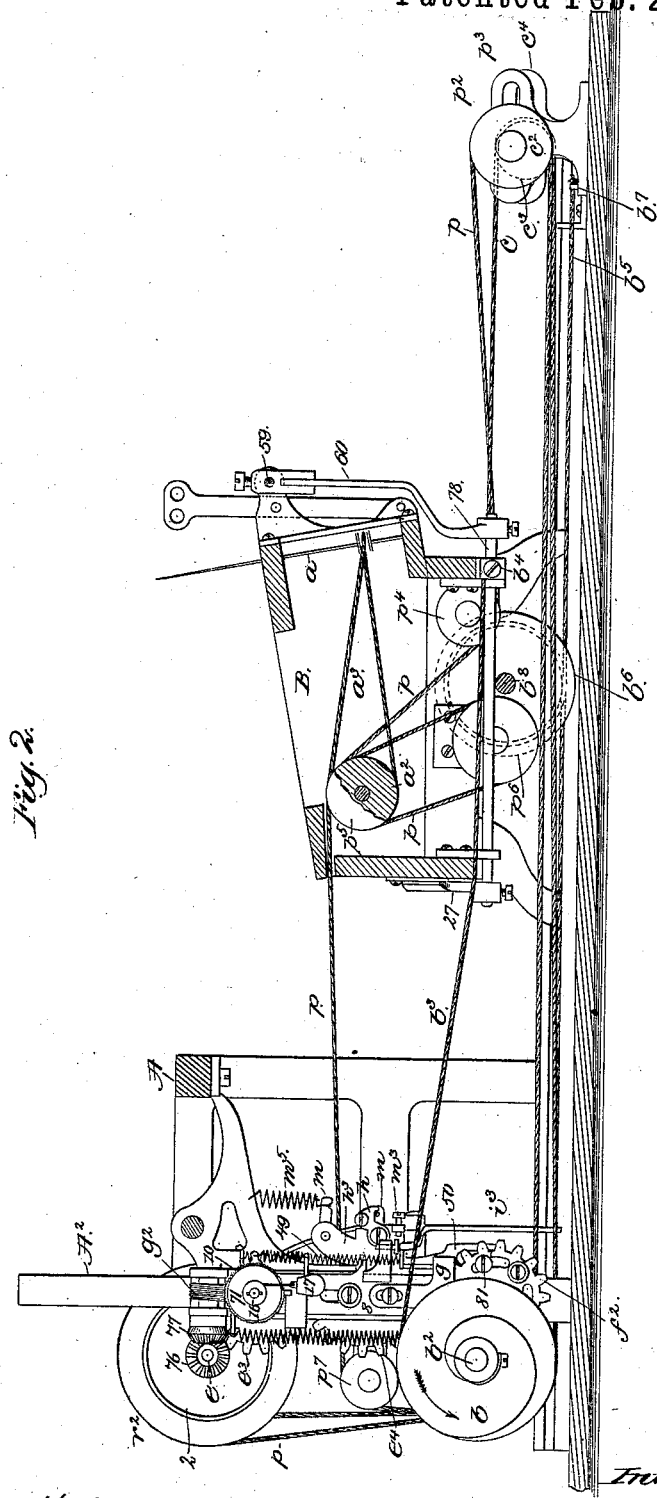
Figure 3:
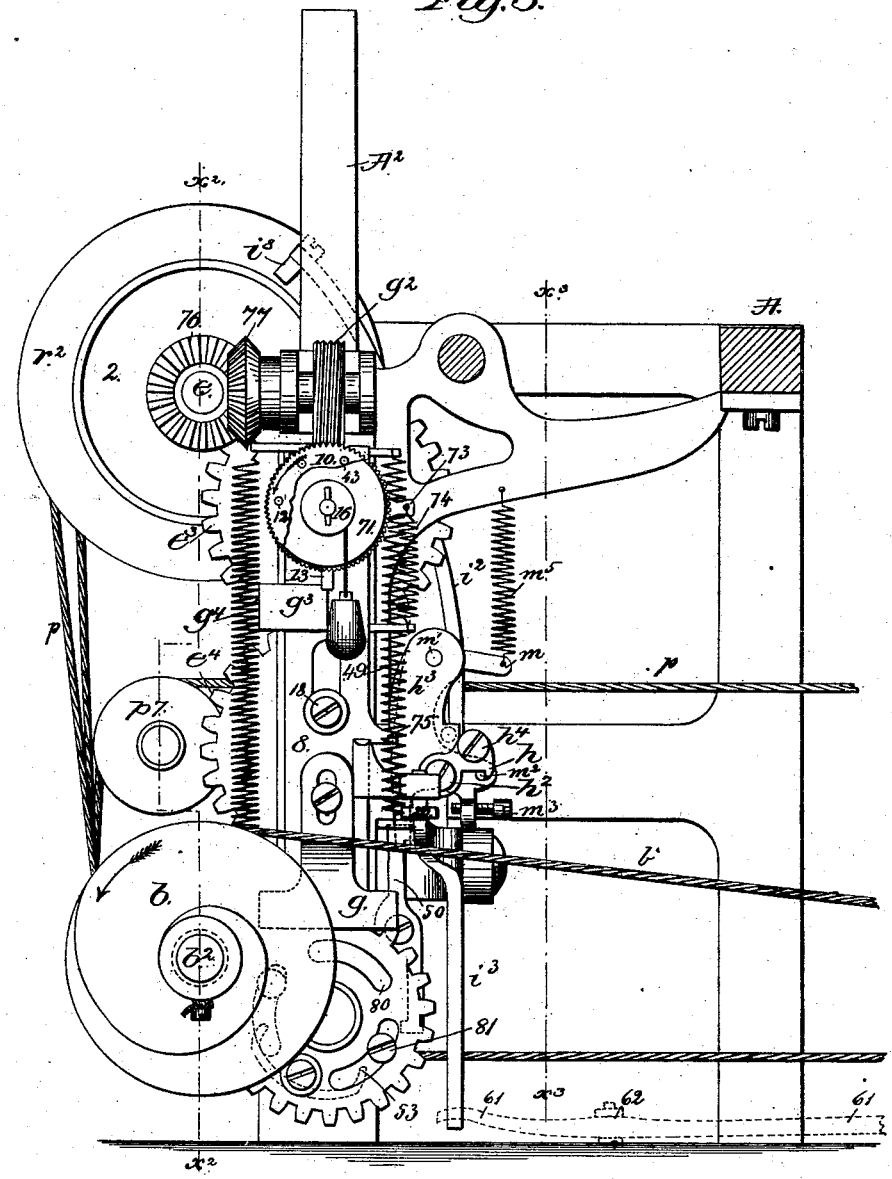
Figure 4:
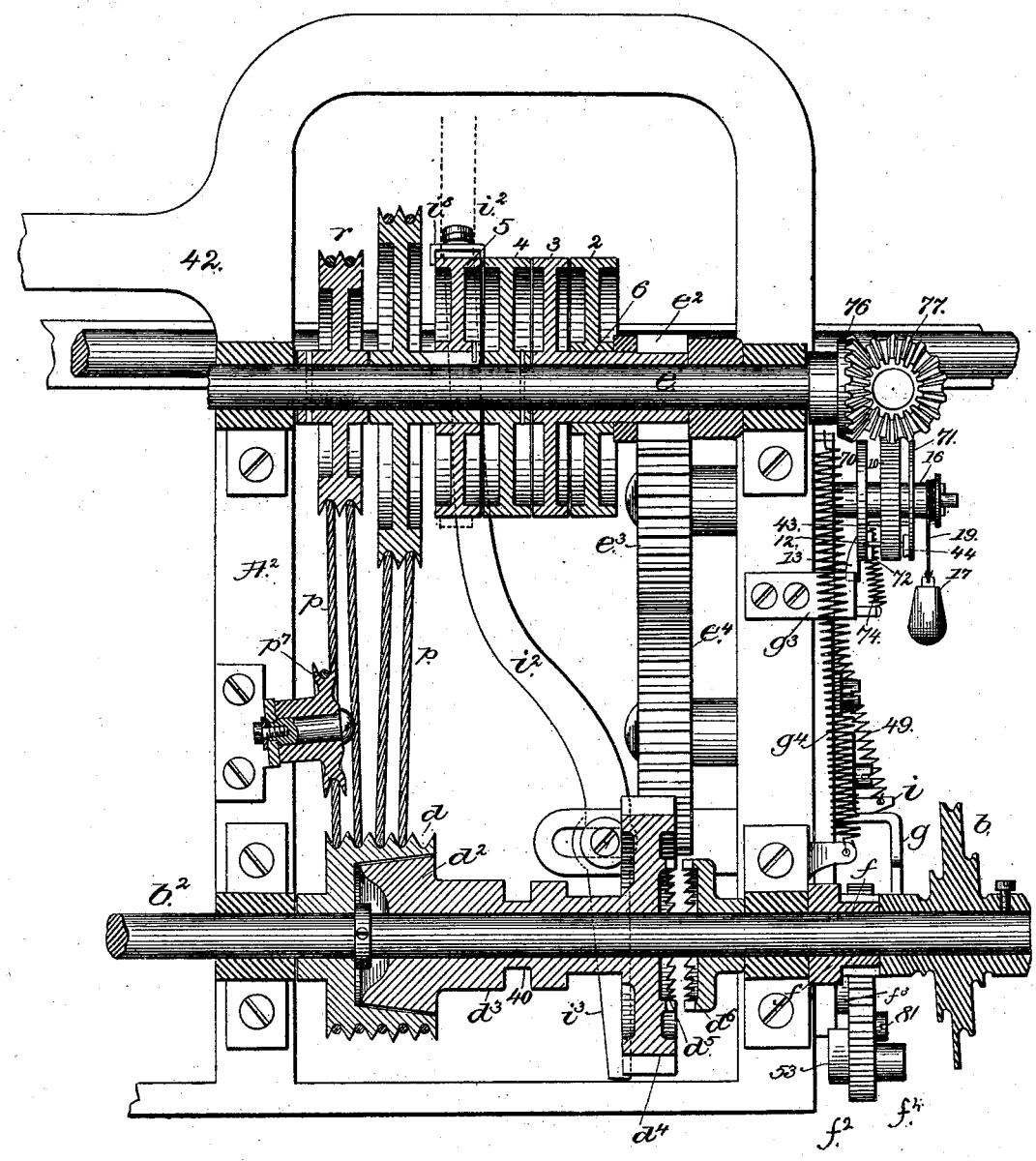
Figure 5:
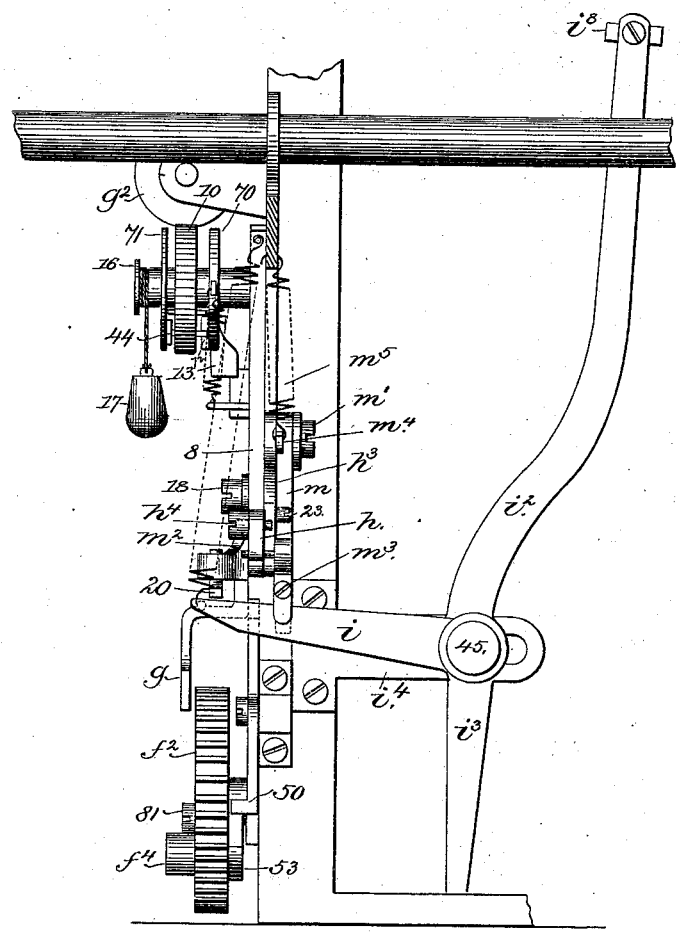

Figure 1 represents a rear elevation of a sufficient portion of a mule spinning-machine, taken in connection with the McGovern patent referred to, to illustrate my improvements, the belt-shipper being in position to retain the usual driving-belt, shown in dotted lines on the pulley fixed to and moving the rim-wheel of greatest diameter which is made instrumental in driving the spindles at their fastest speed, the carriage being supposed to be moving outward. Fig. 2 is a vertical section of the left-hand end of the mule-head and the carriage, viewed from the right of the dotted line $x$ $x$, Fig. 1. Fig. 3 is an enlarged detail of a portion of the parts of the mule-head shown in Fig. 2. Fig. 4 is an enlarged detail in vertical section on the dotted line $x^2$, Fig. 3, of the head of the mule, the two rotating shafts in the said figure and the bevel-gear on the main driving-shaft being shown in elevation. Fig. 5 is a partial sectional detail on the dotted line $x^3$ $x^3$, Fig. 3, showing the twist-regulating slide, its co-operating devices, and the belt-shipper. Fig. 6 is a detail showing the twist-regulating slide with the clock or worm gear thrown down and out from engagement with the worm which moves it, and also the gear and pin or roll on it to move the said slide. Fig. 7 represents the devices of Fig. 6 with the exception of the twist-regulating slide and the gear, and the pin or roll which moves the slide, they having been removed to show the devices at the rear of them, the detent and catch being shown in their different positions by full and dotted lines. Fig. 8 shows the twist-regulating slide separately. Fig. 9 is a detail showing the detent which is but partially shown in Fig. 7. Fig. 10 is a detail showing the fast-speed catch, part of the belt-shipper, and the rear side of the pin or stud carrying gear which actuates the twist-regulating gear, to show the adjustable cam thereon which releases the fast-speed catch at the proper time; Fig. 11, details of the usual clock, and Fig. 12 a detail to be referred to.

In the drawings, A represents the usual roller-carrying frame, at the rear part of which is the frame $A^2$, which supports the principal operative parts of the so-called head of the mule, or the devices which are instrumental in moving the carriage B, its attached parts, and spindles $a$ at the proper times. The drums $a^2$ and bands $a^3$ drive the spindles. The inward movement of the carriage is produced by the bands $b^3$, connected at one end with the drawing-in scrolls $b$ $b$, fixed upon the usual drawing-in shaft, $b^2$, and connected at their other ends with the lugs or clamps $b^4$, depending from the front of the carriage. The movement of the carriage at the ends is kept even by the usual squaring-bands, $b^5$, secured at each end to suitable eyes or bolts, $b^7$, connected with the floor and extended about the wheels $b^6$ on the shaft $b^8$ of the carriage. The carriage is run out by the employment of a band on a scroll, U', of a scroll-shaft, U, (see Fig. 1,) such as marked by the same letters in the McGovern Patent No. 193,887. In the mule shown in the said patent the shaft U is driven through a suitable clutch thereon actuated by suitable gearing deriving its motion from a gear on the main driving-shaft. The gear last referred to is not shown in the said patent; but in this my application I have shown such gear at 42 on the end of the main driving-shaft $e$.

As the mechanism employed by me to run the carriage out is common to the well-known McGovern mule referred to, I do not deem it necessary to further describe how the outward run of the carriage is effected.

The drawing-in shaft $b^2$ has upon it the check-scroll $c^2$, with which is connected one end of the check-band $c$, which latter, after being extended around the sheave $c^3$ (shown in dotted lines, Fig. 2, as adjustably supported by the slotted stand $c^4$, secured to the floor,) is attached to a clamp or ear at the front of the carriage, like the stud $b^4$, before referred to. The drawing-in shaft $b^2$ has loose upon it the scored female part $d$ of a friction-clutch, $d$ $d^2$, the male part $d^2$ to fit within and move it, being also placed loosely on the said shaft. The sleeve $d^3$, connected with the said male part $d^2$, has a toothed gear, $d^4$, having at its side one part, $d^5$, of a clutch-box adapted to be engaged with the other part, $d^6$, thereof fast on the said shaft. When it is desired to run the carriage B in, the driving-belt (shown in dotted lines, Fig. 4) is moved upon the pulley 3, fast on the sleeve 6, placed loosely on the main driving-shaft $e$, so that the pinion $e^2$, fast on the said sleeve, through the idle-gears $e^3$ $e^4$, will drive the gear $d^4$ and cause it, with its part $d^5$, then in engagement with part $d^6$, to turn shaft $b^2$ and the scrolls $b$ in the direction of the arrow thereon in Fig. 3. When the carriage is running out and the rovings are being drawn the clutch-box $d^5$ $d^6$ is disengaged, and the parts $d$ $d^2$ of the friction-clutch are also disengaged. This sleeve $d^3$ has an annular groove, 40, and it will be actuated by means substantially as in the McGovern patent referred to, and shown in its Fig. 4.

The shaft $b^2$ has fixed upon it a small pinion, $f$, which is engaged with and rotates in one and then in the reverse direction the gear $f^2$ on the stud $f^3$, fixed to frame $A^2$. (See Fig. 6.) This gear is provided with the pin or roll $f^4$, which, at the proper times, strikes the adjustable foot $g$ of the twist-regulating slide 8, provided at its upper end with the usual clock. This clock is not of my invention, yet I will say that it is composed of a worm-toothed gear, 10, having a series of holes, (see Fig. 11,) through two of which, at the proper distance apart, depending upon the amount of twist to be put into the yarn, are inserted movable pins 12 and 43, and of two disks, 70 71, to be further described. During the rotation of the gear 10 in the direction of the arrow thereon in Fig. 3 by the worm $g^2$ the pin 12 strikes projection 72 of the disk 70, having the dog 13, (see Fig. 11,) and turns the disk far enough to force the dog 13 from the notched part of the rest $g^3$, (see Fig. 3,) which permits the twist-regulating slide to drop in practice by the action of gravity alone, but, as herein shown, by the spring $g^4$ into the position Fig. 6. This disk has an ear, 73, to which is secured a spring, 74, the normal tendency of which is to turn the disk in the direction to place the dog 13 over the rest $g^3$, which is the purpose of the spring when the twist-regulating slide 8 is lifted.

In front of gear 10 is a disk, 71, (shown as partially broken away in Fig. 3,) having at its front side a drum, 16, and a projection, 44, at its inner side, (see Fig. 11,) which latter is engaged by the pin 43 of the gear 10, it then acting to turn the said drum to wind upon it a cord, 19, connected with a weight, 17, the said cord and weight reversing the drum and gear 10 by the action of projection 44 of the disk on the pin 43, which restores them to their normal position as soon as the gear 10 is released from the worm $g^2$, as is the case when the dog 13 is removed from the rest $g^3$ and the twist-regulating slide is permitted to descend. The rest $g^3$, fixed to the frame $A^2$ and bent around in front of the twist-regulating slide 8, and the headed pin 18 in a slot in the said slide, serve to guide it vertically against the frame $A^2$. The slide 8 has a projection provided with an adjustable striking-piece, 20, which, when the carriage is at its outward run and the twist-slide is descending, (the twist having been put in,) comes against the arm $i$ of the belt-shipper, pivoted at 45 on the bracket $i^4$, it having two other arms, $i^2$ $i^3$, and moves the said shipper to transfer the belt from pulley 4, fast on the driving-shaft, to pulley 3 on sleeve 6, to commence backing off, as in the said McGovern patent, the friction-clutch parts $d$ and $d^2$ having been engaged as the twist-regulating slide dropped, as in the said McGovern patent. The fork $i^3$ of the shipper-lever embraces the belt. This friction-clutch (not of my invention) is so engaged only during backing off. The slide 8 has a finger, 75, which, as the slide descends, strikes an arm on catch $h$, pivoted at $h^2$ on the bracket $h^3$, and moves the said catch to release the pin $m^2$ of the detent $m$, pivoted at $m'$ upon the rear side of the bracket $h^3$, such release of the detent $m$ permitting spring $m^5$ to turn it and place its lower end above and prevent the arm $i$ from thereafter rising far enough to move the shipper-lever sufficiently to carry the usual driving belt from pulley 3 to pulley 4 while the carriage is running in.

I want to insure the movement of the belt from the pulley 3 to the pulley 4, which moves the shaft $e$ to run the carriage out and put in the twist only after the carriage strikes its usual back stops, 51, in its inward run. To do this, I have provided the detent near its lower end with an adjusting-screw, $m^3$, so that as the carriage completes its inward run the plain face of the lever 27 at the rear of the carriage (see Fig. 12) on the shaft 78 will strike the said adjusting-screw and force the detent backward away from above the arm $i$ of the shipper-lever, so that its spring 49 can operate the shipper far enough to place the belt on pulley 4, at which position it is arrested in its movement by the upper end of the fast-speed catch 50.

In the operation of the machine, as the carriage arrived at its back stops, 51, or completed its inward run, and while the drawing-in shaft $b^2$ was engaged and driven positively through the clutch-box $d^5 d^6$, the pinion $f$ acted to turn the gear $f^2$ so that its pin $f^4$ acted upon the foot $g$ of the slide 8, and placed the clock or worm gear 10 in engagement with the worm $g^2$. Just as the carriage strikes its back stops, 51, the slide 8 having been lifted, the clutch-box $d^5 d^6$ is released by mechanism such as used in the McGovern mule, which thus throws out of operation the mechanism for drawing in the carriage; but the sleeve $d^3$ is not moved far enough to engage the friction-clutch, as it is arrested in an intermediate position, and the drawing-out scroll and shaft are then set in motion as in the said McGovern mule. During this outward movement of the carriage and the drawing of the yarn the spindles will be moved at their slow speed, and the drum $a^2$ will be driven by the rim-wheel $r$ of smallest diameter and the rim-band $p$, the said rim-wheel being fast on shaft $e$, as is the pulley 4. This rim-band $p$ is endless, and is wound about the rim-wheels $r$ $r^2$, the scored part $d$ of the friction-clutch, the sheave $p^7$, the scored hub $p^5$ on the drum-shaft, the scored sheave $p^4$, also on the carriage, and the adjustable sheave $p^2$, having its pin held in the bracket $p^3$, secured to the floor. During the outward movement of the carriage or just before it reaches its outward position, at the pleasure of the operator, according to the quality of the roving being spun, the cam 53 on a disk, 80, adjustably connected with the rear side of the gear $f^2$ by screws 81, (see Figs. 6 and 10,) strikes the lower end of the fast-speed catch 50 and moves it to liberate the shipper, so that the spring 49 assumes control of the shipper and moves it to place the belt on the pulley 5, as in Fig. 4, the arm $i$ of the shipper then striking the adjustable piece 20. In this position the pulley 5 will be driven positively and will drive the rim-wheel $r^2$ of greatest diameter, so that it becomes the driver for the rim-band. This rim-band being common to both rim-pulleys and to the part $d$ of the friction-pulley, the latter part, $d$, becomes an idle-pulley, and the rim-band, by its adhesion with the rim-wheel $r$ of least diameter, drives it and the driving-shaft $e$ and its connections, before described, at a faster rate of speed than when the belt was on the pulley 4. The spindles, driven in this way at their high speed, continue to so revolve while the carriage is out, and continue to put in twist until the pin 12 of the clock acts to disengage the dog 13 and let the twist-regulating slide fall, it taking the shipper with it through the adjusting-piece 20, transferring the belt to the pulley 3, operating the catch $h$, and releasing the detent to be moved outward to hold the shipper in position with the belt on pulley 3 until released, as before described. The spring 49 is connected at one end with the arm $i$ of the shipper and at its other end with the slide 8, so that the said spring shall be controlled as to its force by the position of the twist-regulating slide. The twist having been put in, the mule is backed off, the drawing-in clutch $d^5 d^6$ is put in gear, and the carriage is drawn in, as before described. As the gear $f^2$ is reversed in its movement during the inward run of the carriage, its cam 53 is carried away from the lower end of the fast-speed catch and permits the spring 58 to act and throw the hooked upper end of the said catch over the arm $i$ of the shipper-lever, held down by the detent $m$, the said catch being thereafter released as the carriage runs out, as before described.

In case the operator desires to stop the carriage at its inward run to "mend up" yarn or for other purpose, the lever 27 will be turned aside through the shifting-rod 59, mounted on the carriage and connected with the shaft 78 by the jointed lever 60, so that the plain face of the lever 27 will not strike the adjusting-screw $m^3$, and consequently the detent will not be moved back to release the shipper and place the belt on pulley 4.

When it is desired to start the mule the operator, by the shifting-rod 59, will move the lever 27 so that the inclined portion 79 of its face will meet the screw $m^3$ and push back the detent $m$ to release the belt-shipper, as before described.

Should the operator wish to stop the mule at any other point than at its back stops, 51, he need only to strike with his foot the lever 61, (see Fig. 3, dotted lines,) pivoted at 62 on the floor, and by the action of the rear end of the said lever upon the lower end of the shipper-lever move it far enough to place the belt on the loose pulley 2, or in any other usual way. This lever is common and not of my invention.

I claim—

1. The rim-wheels $r$ $r^2$, of different diameters, the main shaft $e$, and means to drive the said wheels separately, combined with the scored part $d$ of the friction-pulley, the rim-band, the drum $a^2$, driven thereby, and the spindle-bands and spindles and carriage, whereby the said spindles may be driven automatically at two different speeds while drawing and twisting, substantially as and for the purpose described.

2. The belt-shipper, the fast-speed catch to hold it, the pulley 4, shaft $e$, its connected rim-wheel $r$, the rim-wheel $r^2$, and its pulley 5, the rim-band, the carriage, its spindles, drum $a^2$, and bands $a^3$, combined with the gear $f^2$, and its cam, and means to drive the said gear and cam, substantially as described.

3. The drawing-in scroll-shaft, means to move it while the carriage is moving in, the pinion $f$ on the said shaft, and the gear $f^2$, having a pin or roll, $f^4$, combined with and adapted to lift the twist-regulating slide as the carriage is just completing its inward run, substantially as described.

4. The twist-regulating slide 8, provided with the adjusting-piece 20 thereon to actuate the shipper-lever, and the projection 75 to actuate the catch $h$, combined with the said shipper-lever, the catch $h$, and the detent $m$ to hold the shipper-lever, and with means to actuate the detent and move it back from contact with the shipper-lever at the inward run of the carriage, substantially as described.

5. The shipper-lever, the detent to hold it, and the adjusting-screw in the detent, combined with the carriage, means to move it inward, and with the lever thereon to strike the said adjusting-screw as the carriage completes its inward run, substantially as described.

6. The carriage, the shifting-rod thereon, the lever carried by it having the plane and inclined face, and means to connect the said shifting rod and lever, combined with the detent and with the shipper-lever, substantially as and for the purpose described.

7. The drawing-in scroll-shaft, means to move it and the gear $f^2$, and the cam carried by the said gear, combined with the fast-speed catch and the belt-shipper arm $i$, substantially as and for the purpose described.

8. The detent to hold the shipper in one position, and means to turn the said detent to release the shipper, combined with the fast-speed catch to catch and hold the belt-shipper after being released by the detent, and with a spring to move the shipper, substantially as and for the purpose described.

9. The worm and means to move it, combined with the drawing-in scroll-shaft and clock or worm gear, and suitable intermediate devices between the said clock and drawing-in scroll-shaft to engage the clock or worm gear with the said worm as the carriage is just completing or completes its inward run, substantially as described.

In testimony whereof I have signed my name to this specification in the presence of two subscribing witnesses.

EBEN A. BALDWIN.

Witnesses:
G. W. GREGORY,
W. H. SIGSTON.